United States Patent
Suzuki

(10) Patent No.: US 9,350,088 B2
(45) Date of Patent: May 24, 2016

(54) SWAGING STRUCTURE FOR METALLIC MEMBERS AND BUS BAR USING THE SAME

(75) Inventor: Takafumi Suzuki, Yamanashi-ken (JP)

(73) Assignee: SUNCALL CORPORATION, Kyoto (JP)

( * ) Notice: Subject to any disclaimer, the term of this patent is extended or adjusted under 35 U.S.C. 154(b) by 0 days.

(21) Appl. No.: 14/241,679

(22) PCT Filed: Sep. 11, 2012

(86) PCT No.: PCT/JP2012/073112
§ 371 (c)(1),
(2), (4) Date: Feb. 27, 2014

(87) PCT Pub. No.: WO2013/039043
PCT Pub. Date: Mar. 21, 2013

(65) Prior Publication Data
US 2014/0216814 A1    Aug. 7, 2014

(30) Foreign Application Priority Data

Sep. 12, 2011   (JP) .................................. 2011-198068

(51) Int. Cl.
*H01R 4/20*   (2006.01)
*H01R 4/18*   (2006.01)
(Continued)

(52) U.S. Cl.
CPC .................. *H01R 4/18* (2013.01); *H01M 2/206* (2013.01); *H01R 4/06* (2013.01); *H01M 2220/20* (2013.01); *H01R 4/62* (2013.01); *H01R 31/08* (2013.01); *Y10T 29/53996* (2015.01)

(58) Field of Classification Search
CPC .............. H01H 1/06; H01H 4/20; H01H 4/58
USPC .................... 174/84 C, 94 R; 361/758, 807
See application file for complete search history.

(56) References Cited

U.S. PATENT DOCUMENTS 6,542,372 B1 *   4/2003   Paquin et al. ................. 361/758
7,593,239 B2 *   9/2009   Li et al. ......................... 361/807
(Continued)

FOREIGN PATENT DOCUMENTS

CN         101926050        12/2010
CN         101971425         2/2011
(Continued)

OTHER PUBLICATIONS

Japanese Office Action issued Jul. 7, 2014 in corresponding Japanese Patent Application No. 2011-198068 with English translation.
(Continued)

*Primary Examiner* — Chau N Nguyen
(74) *Attorney, Agent, or Firm* — Wenderoth, Lind & Ponack, L.L.P.

(57) ABSTRACT

A swaging structure for metallic members includes a metallic plate having a hole portion, and a disc-shaped conductive member which is fitted in the hole portion and fixed to the metallic plate by swaging a circumference of the hole portion. The metallic plate includes a groove portion provided in at least one surface side of the metallic plate about the hole portion of the metallic plate, and the conductive member includes a vertical flange provided on an outer circumference of the conductive member and protruding from the at least one surface side. The conductive member is fitted in the hole portion of the metallic plate, and when the conductive member is swaged onto the metallic plate, the vertical flange of the conductive member is deformed, and the groove portion of the metallic plate is filled with the deformed vertical flange.

9 Claims, 9 Drawing Sheets

(51) Int. Cl.
    *H01M 2/20*     (2006.01)
    *H01R 4/06*     (2006.01)
    *H01R 4/62*     (2006.01)
    *H01R 31/08*     (2006.01)

(56) References Cited

U.S. PATENT DOCUMENTS

| | | |
|---|---|---|
| 2010/0243322 A1 | 9/2010 | Hublier et al. |
| 2011/0003519 A1 | 1/2011 | Oka et al. |

FOREIGN PATENT DOCUMENTS

| | | |
|---|---|---|
| EP | 2 242 145 | 10/2010 |
| JP | 47-10864 | 4/1972 |
| JP | 59-815 | 1/1984 |
| JP | 60-50823 | 3/1985 |
| JP | 04-368723 | 12/1992 |
| JP | 2001-210284 | 8/2001 |
| JP | 2002-358945 | 12/2002 |
| JP | 2004-039256 | 2/2004 |
| JP | 2011-501354 | 1/2011 |
| JP | 2011-060623 | 3/2011 |
| JP | 2011-082164 | 4/2011 |
| WO | 2009/096013 | 8/2009 |
| WO | 2012/102610 | 8/2012 |

OTHER PUBLICATIONS

Japanese Office Action issued Sep. 17, 2014 in corresponding Japanese Patent Application No. 2011-198068 with English translation.
International Search Report issued Oct. 30, 2012 in International (PCT) Application No. PCT/JP2012/073112.
Chinese Office Action issued Sep. 25, 2015 in corresponding Chinese Patent Application No. 201280040490.7 with English Translation.
Machine Translation of JP 2004-039256 published Feb. 5, 2004.

* cited by examiner

SWAGING STRUCTURE FOR METALLIC MEMBERS AND BUS BAR USING THE SAME

TECHNICAL FIELD

The present invention relates to a swaging structure for metallic members and a bus bar using the swaging structure.

BACKGROUND ART

A swaging structure is conventionally often used to connect metallic members to each other. The swaging structure has a configuration in that, in a hole portion provided in one metallic member, a fitted portion of another metallic member is fitted, thereafter, a pawl portion provided on the fitted portion is deformed to be engaged with a circumference of the hole portion of the one metallic member. The swaging structure is often used for terminals of batteries, various connectors and so on.

As an example using the swaging structure, there is a connection plate (bus bar) to connect electrode terminals of a plurality of batteries. In recent years, the bus bar has been used for an assembled battery (batter module) installed on hybrid vehicles or electric vehicles in place of conventional gasoline vehicles, and the demand for the bus bar is increased. In such an in-vehicle use, a battery module in which a plurality of lithium-ion batteries which are secondary batteries are connected in series is used. In the battery module, a bus bar to electrically connect electrode terminals of the plurality of assembled lithium-ion batteries (battery cells) is used. The bus bar is formed as a rectangular metallic plate having a pair of electrode terminal-inserting holes to insert the electrode terminals therein (Patent Documents 1 and 2)

In addition, there is a case where the pair of electrode terminals are made of heterogeneous metallic materials. Therefore, the bus bar is often formed by fitting a conductive member made of a dissimilar metallic material to a metallic plate in the metallic plate. The conductive member has a terminal hole to insert one of the electrode terminals therein. For example, if the battery cell is a lithium-ion battery, a positive electrode is made of an aluminum material and a negative electrode is made of a copper material. In this case, the metallic plate is made of a copper material and the conductive member is made of an aluminum material which is similar to one of the electrode terminals.

The bus bar is bridged between the plurality of battery cells by inserting electrode terminals in the pair of electrode terminal-inserting holes the metallic plate and fastening the metallic plate to the electrode terminals by use of bolts and nuts and so on to electrically connect the metallic plate and the electrode terminals. In this way, because a large number of bus bars are used for the battery module depending on the number of a combination of battery calls, an electric resistance of the bus bars becomes high. In addition, as mentioned above, in the bus bars used in the lithium-ion battery employed in the hybrid vehicles or the electric vehicles, because the conductive member is combined to the metallic plate made of a dissimilar metallic material to that of the conductive member, it is not possible to ignore an electric resistance at a junction portion between the metallic plate and the conductive member, this fact makes an impact to electric conversion efficiency or durability.

RELATED ART

Patent Documents

Patent Document 1 JP2011-82164A
Patent Document 2 JP2011-60623A

Problems to be Solved by the Invention

To connect metallic members to each other without losing conductivity, the foregoing swaging structure is often used without using a connection member such as an adhesive. In particular, in the foregoing bus bar, because the metallic plate and the conductive member are made of dissimilar metallic materials, the swaging structure is most effective to reduce an electric resistance and ensure a strength of connection between the metallic plate and the conductive member.

However, as mentioned above, the conventional swaging structure has a configuration in which, in the hole portion provided in the one metallic member, the fitted portion of the another metallic member is fitted, thereafter, the pawl portion provided on the fitted portion is crushed or deformed to be engaged with the circumference of the hole portion of the one metallic member. Consequently, there is a case where the junction portion between the metallic members is not closely fitted. In addition, concavities and convexities are generated on a surface of the junction portion. If such a swaging structure is used in an electrical contact portion, there is a problem in that conductivity becomes poor, and the junction strength is reduced by deterioration and so on of the junction portion. In particular, if the bus bar is used for electrical contact portions of an in-vehicle battery module, there is a problem in that a power source cannot be supplied stably, and the battery module has a short life-span.

SUMMARY OF THE INVENTION

Therefore, an object of the present invention is to provide a swaging structure capable of connecting metallic members stably and firmly, and reducing an electrical resistance even if the metallic members are made of metallic materials, and a bus bar using the swaging structure.

To accomplish the above object, a swaging structure according to one embodiment of the present invention includes a flat plate-shaped first metallic member having a hole portion, and a disc-shaped second metallic member which is fitted in the hole portion and thereafter fixed to the first metallic member by swaging a circumference of the hole portion. The first metallic member includes a groove portion provided in at least one surface side of the first metallic member about the hole portion of the first metallic member, and the second metallic member includes a vertical flange provided on an outer circumference of the second metallic member and protruding from the at least one surface side. The second metallic member is fitted in the hole portion of the first metallic member, and when the second metallic member is swaged onto the first metallic member, the vertical flange of the second metallic member is deformed, and the groove portion of the first metallic member is filled with the deformed vertical flange.

In addition, the bus bar according to the present invention includes a metallic plate having at least a pair of hole portions and a conductive member fitted in one of the pair of hole portions and swaged on the metallic plate. The metallic plate and the conductive member are fixed by the swaging structure according to the present invention.

Advantageous Effects of the Invention

In the swaging structure for metallic members according to the present invention, the first metallic member includes a hole portion having a groove portion provided about the hole portion and the second metallic member includes a deformable flange provided at an outer circumference of the second metallic member and fitted in the groove portion of the first metallic member. The flange is deformed or crushed to fill the groove portion with the deformed flange, thereby the first metallic member and the second metallic member are swaged and fixed firmly without having a clearance. In addition, a surface of the junction portion is a flatly continued surface having no concavities and convexities, and hence it is possible to eliminate variations in an electric resistance and reduce the entire electric resistance. Furthermore, by filling the groove portion with the deformed flange, a large junction area can be secured between the first metallic member and the second metallic member and conductivity at the junction portion can be improved.

Furthermore, the use of the swaging structure makes it possible to reduce an electric resistance and improve conductivity between the first metallic member and the second metallic member even if the first metallic member and the second metallic member are dissimilar metallic materials in which the first metallic member is a copper material and the second metallic member is an aluminum material.

In bus bar according to the present invention, because the conductive member which is the second metallic member is closely fitted with and firmly fixed to the metallic plate which is the first metallic member, it is possible to reduce the electric resistance and acquire a high conductivity. Thereby, it is possible to perform the stable supply of power with less electric loss when electrode terminals of a plurality of batteries are connected to each other.

BRIEF DESCRIPTION OF THE DRAWINGS

FIG. 7 is a perspective view showing a state of the conductive member in which

DETAILED DESCRIPTION OF THE PREFERRED EMBODIMENTS

Embodiments of a swaging structure and a bus bar formed by the swaging structure according to the present invention will be explained hereinafter in detail with reference to the accompanying drawings.

Figure 1:
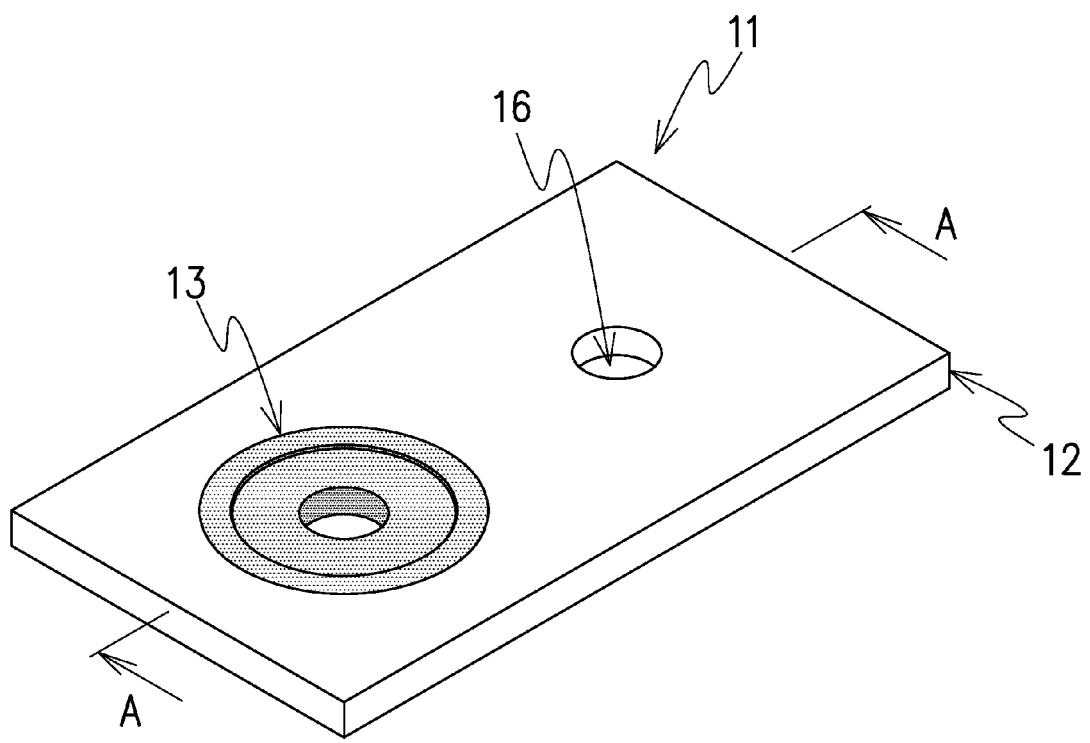
FIG. 1 is a perspective view of a bus bar formed by a swaging structure according to the present invention.

FIG. 1 illustrates an appearance configuration of the bus bar 11 formed by the swaging structure according to the present invention. FIGS. 2 to 7 illustrate a form of the swaging structure in the bus bar 11. In the swaging structure, a disc-shaped conductive member 13 which is a second metallic member is fitted in and fixed to a flat plate-shaped metallic plate 12 which is a first metallic member.

Figure 2:
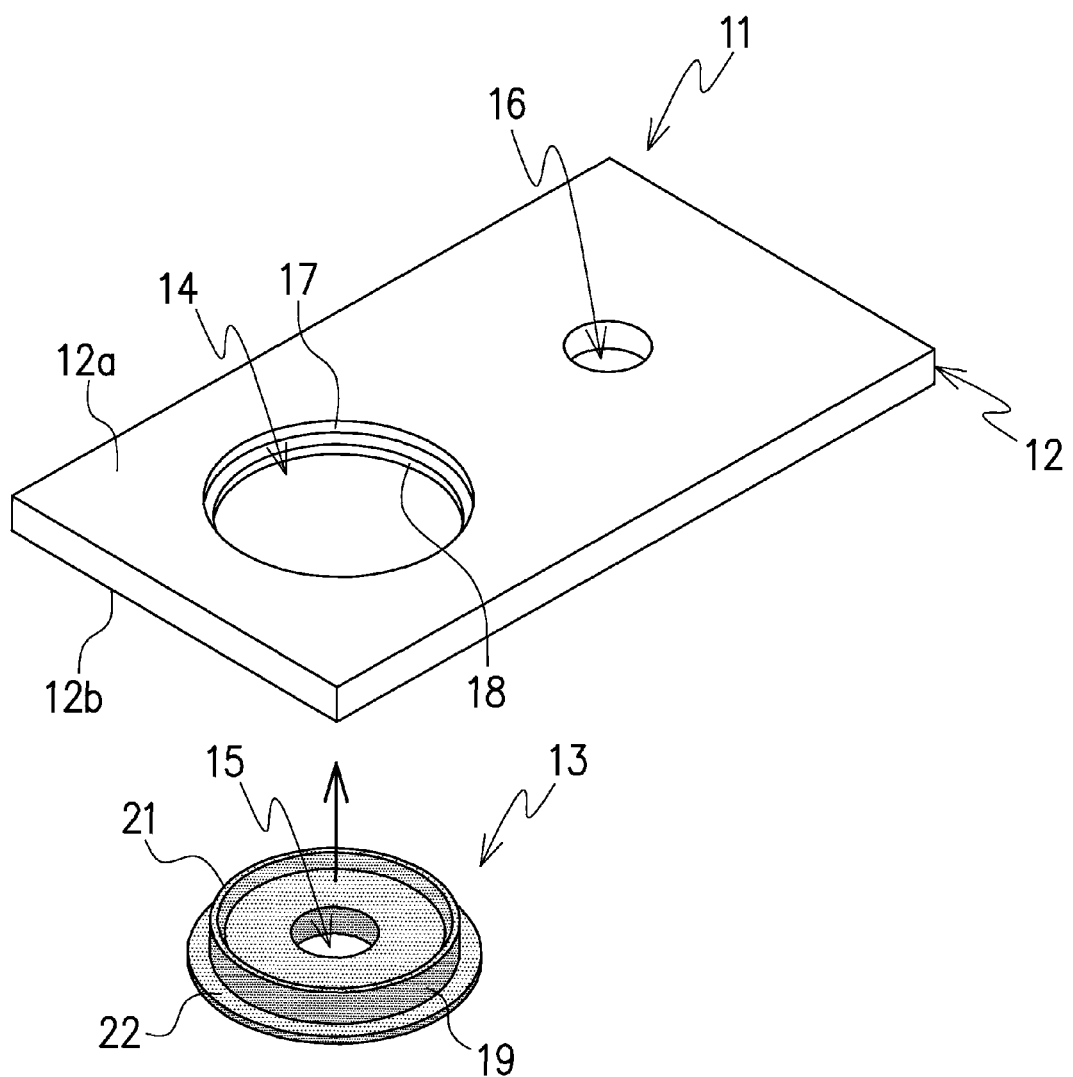
FIG. 2 is a perspective view of the bus bar.
Figure 3:
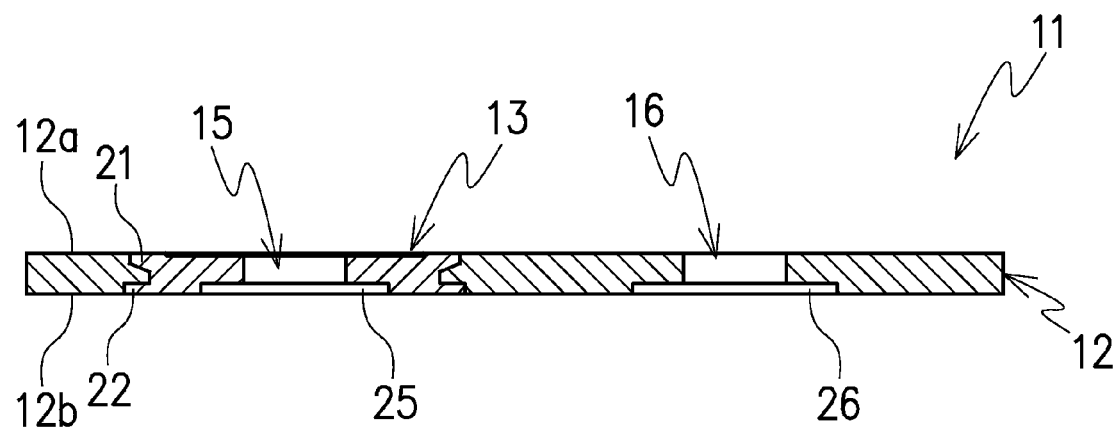
FIG. 3 is a sectional view of the bus bar taken along line A-A of FIG. 1.

As shown in FIGS. 2 and 3, the metallic plate 12 is made of a copper material, has a flat plate-like shape and includes a first hole portion 14 provided in a predetermined place. The conductive member 13 is made of an aluminum material, and has a disc-like shape configured to be capable of fitting in the first hole portion 14. The conductive member 13 includes a body portion 19 fitted in the first hole portion 14, a vertical flange 21 provided on an upper end of the body portion 19 and integrally formed with the body portion 19, and a horizontal flange 22 provided on a lower end of the body portion 19 and formed integrally with the body portion 19. The horizontal flange 22 has a ring-like shape such as being perpendicular to the body portion 19 and is directly fitted in a lower groove portion 18 provided about the first hole portion 14 at a lower surface side of the metallic plate 12. The horizontal flange 22 has substantially the same shape to the lower groove portion 18, and is substantially the same as the lower groove portion 18 in width and thickness. The horizontal flange 22 is flush with a lower surface 12b of the metallic plate 12 when the horizontal flange 22 is fitted in the lower groove portion 18.

Figure 4:
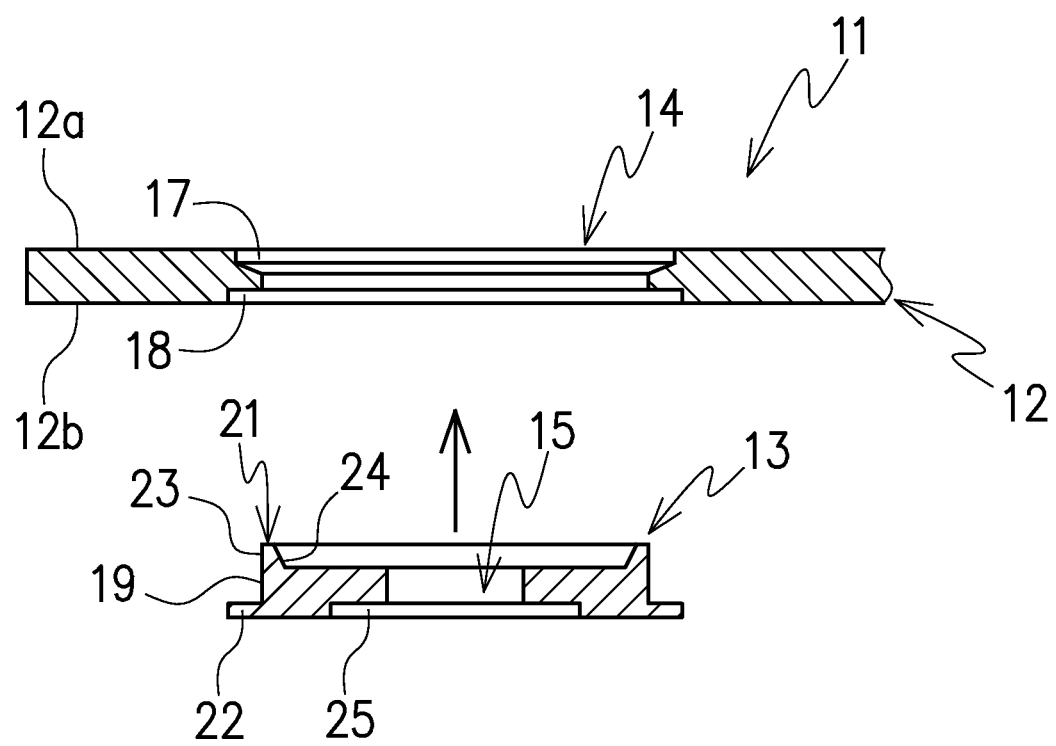
FIG. 4 is a sectional view showing a metallic plate and a conductive member before swaging.
Figure 5:
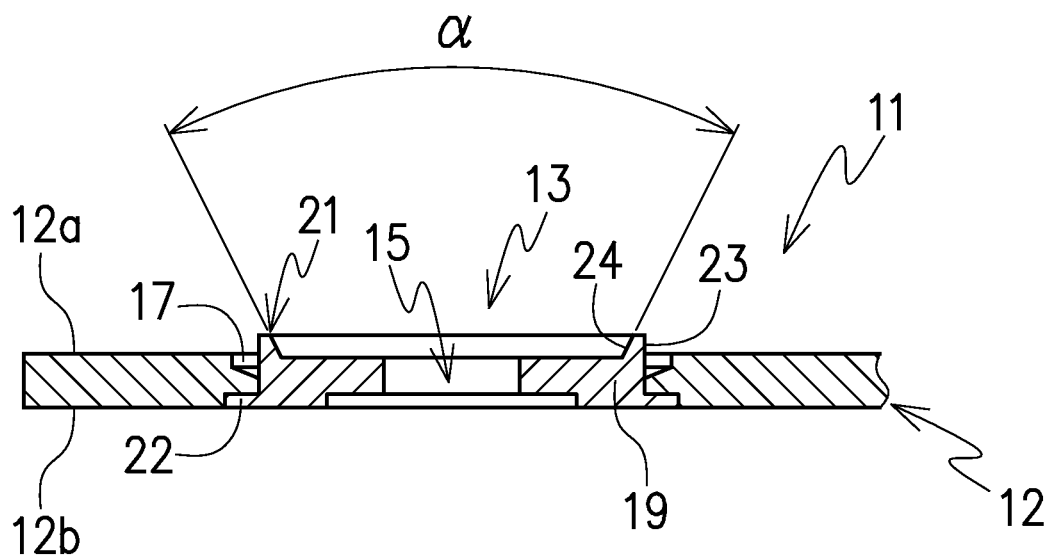
FIG. 5 is a sectional view showing a state where the conductive member is fitted in the metallic plate.
Figure 6:
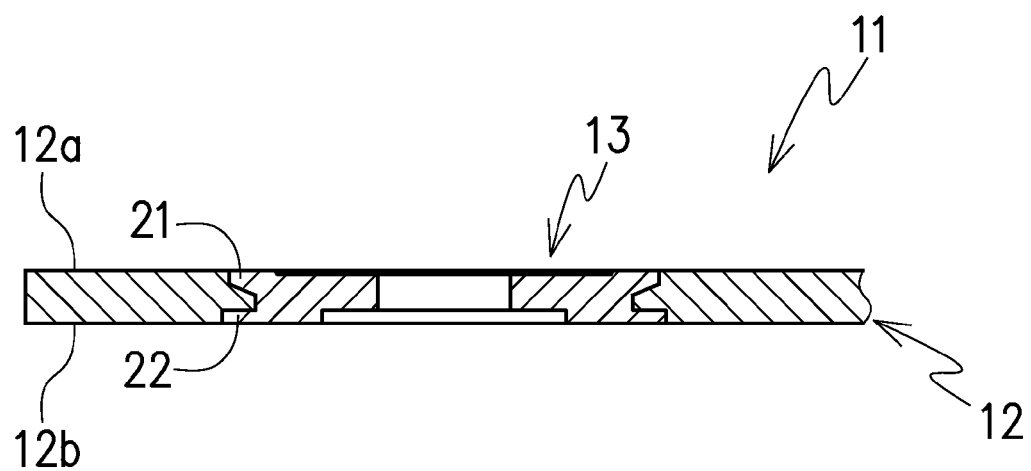
FIG. 6 is a sectional view showing a state where the conductive member is swaged onto the metallic plate.

As shown in FIG. 4, the vertical flange 21 extends perpendicularly along an outer circumferential surface of the body portion 19 and is configured to project from an upper surface 12a of the metallic plate 12 when the conductive member 13 is fitted in the first hole portion 14 provided in the metallic plate 12. The vertical flange 21 includes a circular outer circumferential surface 23 and an inner circumferential surface 24 which is inclined in a tapered shape downward. The vertical flange is formed in a generally triangular shape in section by the outer circumferential surface 23 and the inner circumferential surface 24. As shown in FIG. 5, an elevation angle $\alpha$ of the inner circumferential surface 24 to the upper surface of the body portion 19 is about 60 degrees. With the elevation angle $\alpha$, when pressing the vertical flange 21 by a pressing tool such as a punch and so on from above, the vertical flange 21 is deformed easily so as to extend easily the entirety of the vertical flange 21 in an outer circumferential direction. In this manner, a predetermined pressure is applied to the vertical flange 21 in such a manner that the pressure is applied along the inner circumferential surface from above. Thereby, the outer circumferential surface 23 is pressed toward an inner circumferential surface of an upper groove portion 17 provided about the first hole portion 14 of the metallic plate 12 and deformed to be extended over the inner circumferential surface of the upper groove portion 17, as shown in FIG. 6. Consequently, the upper groove portion 17 is filled with the deformed vertical flange 21, and the conductive member 13 is swaged on and fixed to the metallic plate in a closely-fitted state integrating with the metallic plate 12. The vertical flange 21 is, when it is deformed, flush with the upper surface 12a of the metallic plate 12, and hence it is possible to form the bus bar in a flat surface without a concave and convex portion.

Figure 7A:
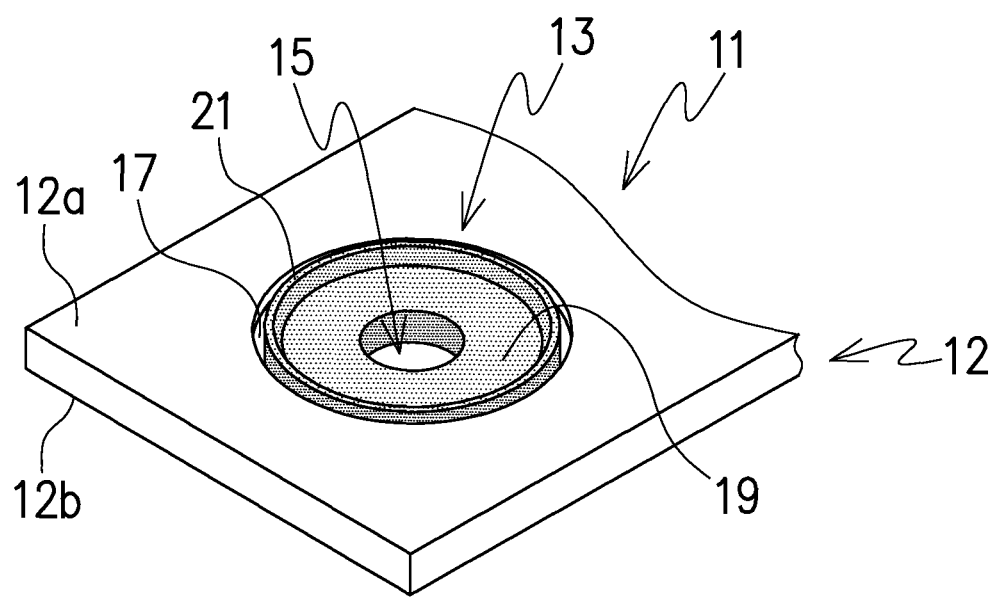
FIG. 7A is a perspective view showing a state where the conductive member is fitted in the metallic plate before swaging the conductive member.
Figure 7B:
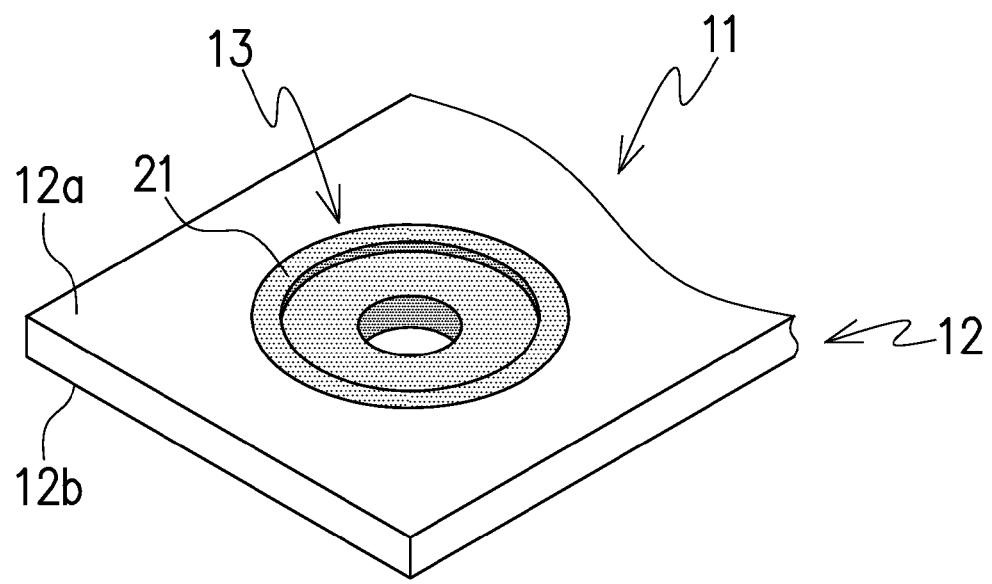
FIG. 7B is a perspective view showing a state where the conductive member is fixed to the metallic plate after swaging the conductive member.

The conductive member 13 is inserted in the first hole portion 14 of the metallic plate 12 from the lower surface of the metallic plate, and the horizontal flange 22 is fitted in the lower groove portion 18, thereafter the metallic plate 12 is placed on a flat working stage. FIG. 7A illustrates a state before swaging the conductive member 13. As shown in FIG. 5, the vertical flange 21 protruding from the upper groove portion 17 is then deformed by pressing a protruded portion of the vertical flange 21 from above by use of a pressing tool such as a punch and so on, and the inner circumferential surface 24 of the vertical flange 21, which is inclined with the elevation angle of about 60 degrees is extended outwardly to fill the upper groove portion 17 with the vertical flange 21 and to closely fit to the inner circumferential surface of the upper groove portion 17. The one pressing process makes it possible to swage and fix the conductive member 13 to the metallic plate 12 in such a manner that the conductive member is flush with the upper surface 12a and the lower surface 12b of the metallic plate 12 and is integrated with the metallic plate 12, as shown in FIG. 7B.

Alternatively, the vertical flange 21 may be first pressed to extend the outer circumferential surface 23 outwardly along the inner circumferential surface 24 by inserting the pressing tool such as the punch and so on in the inner circumferential surface 24, and the vertical flange 21 may be next pressed further toward the upper groove portion 17 by use of a planar pressing tool. At the time of the first pressing, because the vertical flange 21 can be pressed while guiding a leading end portion of the punch and so on by the inclined inner circumferential surface 24, the entirety of the vertical flange 21 can uniformly be extended outward.

Next, embodiments of the bus bar using the swaging structure as mentioned are explained.

Figure 8:
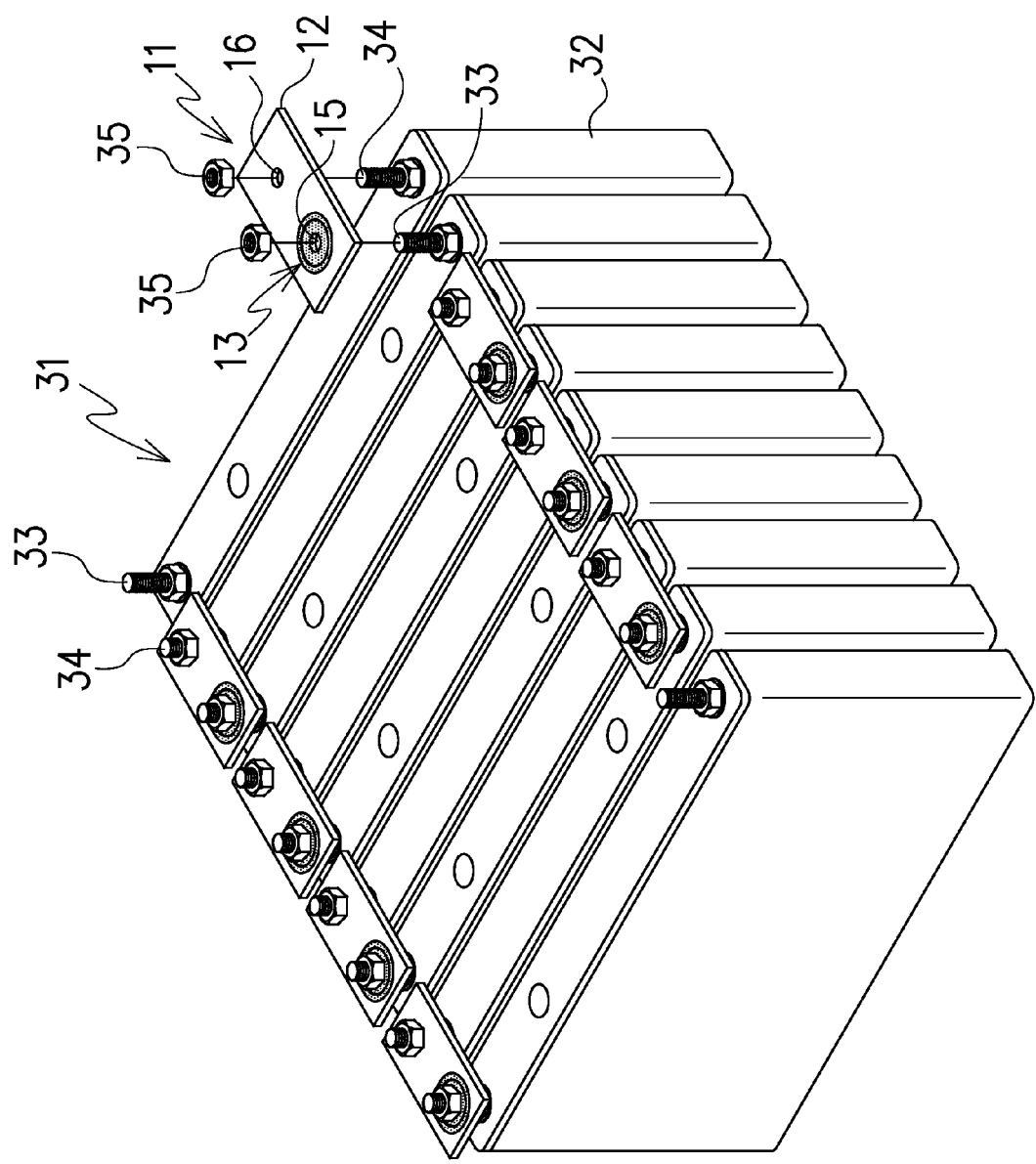
FIG. 8 is a perspective view of a battery module using the bus bar according to the present invention.

As shown in FIG. 1, the bus bar 11 according to the present invention includes conductive connection plates which connect electrode terminals of a plurality of batteries (as shown in FIG. 8) to form an assembled battery (battery module) having a large output (capacity). As mentioned above, the bus bar 11 includes the metallic plate 12 which is the first metallic member, and the conductive member 13 which is the second metallic member and swaged on and fixed to the metallic plate 12. As shown in FIG. 2, the metallic plate 12 is made of cupper having a high conductivity, formed in a rectangular plate-like shape, and is provided with the first hole portion 14 and a second hole portion 16 which are provided in a predetermined places. The conductive member 13 is fixed to the metallic plate 12 by being fitted in the first hole portion 14 from below and by swaging the protruded portion of the vertical flange 21 protruding from the upper surface 12a of the metallic plate 12. Note that the second hole portion 16 is a negative terminal-inserting hole to insert directly a negative terminal 34 (see FIG. 8) of each of battery cells 32 which are connected to each other.

The conductive member 13 is made of an aluminum material, formed in the disc-like shape configured to be capable of inserting in the first hole portion 14 and includes a positive terminal-inserting hole 15 which is provided at a central portion of the conductive member and configured to insert therein an electrode terminal (positive terminal) (see FIG. 8) of each of the battery cells 32. The positive terminal-inserting hole 15 is composed of a conductive hole adapted to accomplish conduction of dissimilar metals between the conductive member 13 and the metallic plate 12 made of a copper material by inserting the positive terminal 33 made of the same kind of aluminum material as the conductive member 13. The positive terminal-inserting hole 15 is configured to fit to a diameter of the electrode terminal, which is different depending on the kind of the battery. In addition, as shown in FIGS. 3 and 4, the conductive member 13 includes a terminal receiving portion 25 which is provided in a lower surface of the conductive member and receives a lower end portion of the electrode terminal (positive terminal) 33. The terminal receiving portion 25 is a concave portion having a square or circular shape formed about the positive terminal-inserting hole 15. On the other hand, a conduction between the metallic plate 12 and the electrode terminal (negative terminal) 34 is accomplished by inserting directly the negative terminal 34 made of a metal of the same kind as the metallic plate 12 in the second hole portion 16. The metallic plate 12 has a terminal receiving portion 26 which is provided in a concave shape in the lower surface 12b of the metallic plate 12 about the second hole portion 16 and receives a lower end portion of the negative terminal 34. The terminal receiving portion 26 has also a square or circular shape.

The metallic plate 12 is formed, as an example, a copper plate having a thickness of 2 to 3 mm, and includes a first hole portion 14 having a diameter of about 17 mm and a second hole portion 16 having a diameter of about 6 mm. The first hole portion 14 and the second hole portion 16 are arranged at a predetermined interval. The first hole portion 14 includes the ring-shaped upper groove portion 17 provided at the upper surface of the metallic plate 12 and the ring-like lower groove portion 18 provided at the lower surface of the metallic plate 12. The upper groove portion 17 and the lower groove portion 18 has respectively a width of about 3 mm and a depth of about 0.5 mm, about the first hole portion 14.

The positive terminal-inserting hole 15 passing through a central portion of the body portion 19 of the conductive member 13 has the same diameter of 6 mm as that of the second hole portion 16. The horizontal flange 22 is formed in the disc-like shape perpendicular to the body portion 19 and fitted directly in the lower groove portion 18 provided in the metallic plate 12. The horizontal flange 22 is the same as the lower groove portion 18 in shape, width and thickness. Therefore, when the conductive member 13 is fitted in the first hole portion 14 of the metallic plate 12, a lower surface of the horizontal flange 22 is flush with the lower surface 12b of the metallic plate 12.

As shown in FIGS. 3 and 4, a connected portion of the conductive member 13 which is fitted in the first hole portion 14 of the metallic plate 12 is composed of a stepped structure including the vertical flange 21 engaging with the upper groove portion 17 of the metallic plate 12 and the horizontal flange 22 engaging with the lower groove portion 18 of the metallic plate 12. Consequently, it is possible to acquire a broad junction area in connecting the metallic plate 12 and the conductive member 13. In addition, because the conductive member 13 is swaged onto the metallic plate 12 by swaging such as crushing the vertical flange 21, the body portion 19 of the conductive member 13 can be fitted closely in the first hole portion 14 without having a clearance. Thereby, it is possible to significantly reduce an electrical resistance in a junction portion between the metallic plate 12 and the conductive member 13 and it is possible to very enhance conductivity of the metallic plate 12 and the conductive member 13 which are dissimilar metal materials. Furthermore, because the conductive member 13 is integrally fitted in the metallic plate 12 in a state where the conductive member 13 is flush with the upper surface 12a and the lower surface 12b of the metallic plate 12, manufacturing variations such as fluctuating an electrical resistance is reduced and a quality of a bus bar is stably maintained.

In the aforementioned embodiments, one of the flanges of the conductive member 13 is the horizontal flange 22 and the other is the vertical flange 21. However, the both flanges are formed in vertical flanges, it is also possible to swage the vertical flanges from both of the upper surface and the lower surface of the metallic plate 12 to fix the conductive member 13 to the metallic plate 12.

FIG. 8 illustrates one example of a structure of the assembled battery (battery module) 31 using the bus bar 11 according to the present invention. The battery module 31 is formed by combining a plurality of battery cells 32. As mentioned above, each of the battery cells 32 includes the positive terminal 33 and the negative terminal 34. If a lithium-ion secondary battery is used as the battery cell 32, because lithium metallic oxide is used for the positive electrode, and a graphite material is used for the negative electrode, the positive terminal 33 is made of an aluminum material and the negative terminal 34 is made of a copper material. These battery cells 32 are arranged so that the positive terminals 33 and the negative terminals 34 are place adjacent to be arranged alternately. In addition, the bus bar 11 is bridged between the positive terminal 33 and the negative terminal 34 of adjacent battery cells so that the battery cells 32 are connected in series. At this time, the positive terminal 33 is inserted in the positive terminal-inserting hole 15 provided in the conductive member 13, and the negative terminal 34 is inserted in the second hole portion 16 provided in the metallic plate 12. The metallic plate 12 is fixed to the positive terminal 33 and the negative terminal 34 by nuts 35 threaded on the positive terminal 33 and the negative terminal 34.

In this way, the use of the bus bar 11 connecting each battery cell 32 makes it possible to electrically connect each of the positive terminal 33 and the negative terminal 34 to a metallic material similar thereto directly. In the embodiments as mentioned above, because the conductive member 13 made of an aluminum material similar to the positive terminal 33 is assembled in the metallic plate 12 by the swaging structure according to the present invention, a wide junction area between the conductive member 13 and the metallic plate 12 can be accomplished, and hence an electric resistance can significantly be reduced and a high conductivity can be acquired. Consequently, the battery module using the bus bar according to the present invention is suitable to hybrid vehicles to which a high electrical conversion efficiency is requested, electric vehicles or electric storage power sources for various electrical products to which an electric power saving is requested.

As explained above, according to the swaging structure of the present invention, because the metallic members are fitted closely by fitting the flange provided on one of the metallic members in the groove portion provided in the other of the metallic members in a state of crushing the flange, the metallic members can be firmly connected, and a surface of the junction portion is flat without concavity and convexity. Therefore, the swaging structure is most suitable to be used for parts to which flatness is required. In particular, by applying the swaging structure to a bus bar, even if metallic members to be connected are dissimilar metallic members, because the metallic members are connected by closely fitting the flange provided on one of the metallic members in the groove portion provided in the other of the metallic members in a state of crushing the flange, it is possible to reduce an electric resistance without occurring a clearance in the connected portion. In addition, because the junction area is wide in a stepped state by a combination of the groove portion and the flange, there is an advantageous effect that conductivity between the metallic members can be improved.

In the embodiments, although the swaging structure has been applied to the bus bar which is a connection member to connect the battery cells, as an example, the application of the swaging structure is not limited to the bus bar, the swaging structure can be applied to various connectors. In addition, the swaging structure is most suitable to connect homogeneous metallic materials or heterogeneous metallic materials. Note that the aforementioned embodiments of the swaging structure are not limited to a combination of the aluminum material and the copper material.

DESCRIPTION OF REFERENCE NUMBERS

11 Bus bar
12 metallic plate
12a upper surface
12b lower surface
13 conductive member
14 first hole portion
15 positive terminal-inserting hole
16 second hole portion
17 upper groove portion
18 lower groove portion
19 body portion
21 vertical flange
22 horizontal flange
23 outer circumferential surface
24 inner circumferential surface
25 terminal receiving portion
26 terminal receiving portion
31 battery module
32 battery cell
33 positive terminal
34 negative terminal
35 nuts

What is claimed is:

1. A swaging structure for metallic members, the swaging structure comprising:
    a flat plate-shaped first metallic member having a hole portion; and
    a disc-shaped second metallic member which is fitted in the hole portion and thereafter fixed to the first metallic member by swaging a circumference of the hole portion,
    wherein the first metallic member includes a groove portion provided in at least one surface side of the first metallic member about the hole portion of the first metallic member, and the second metallic member includes a vertical flange having a substantially triangular shape in section, in which at least an inner circumferential surface is inclined, the vertical flange being provided on an outer circumference of at least one surface side of the second metallic member,
    wherein the second metallic member is fitted in the hole portion of the first metallic member, and when the second metallic member is swaged onto the first metallic member, the vertical flange of the second metallic member is deformed, and the groove portion of the first metallic member is filled with the deformed vertical flange.

2. The swaging structure according to claim 1, wherein when the second metallic member is swaged on the first metallic member, one surface of the first metallic member and the deformed vertical flange are flush to each other.

3. A bus bar comprising:
    a metallic plate having at least one pair of hole portions; and
    a conductive member fitted in one of the pair of hole portions and swaged onto the metallic plate,
    wherein the metallic plate and the conductive member are fixed by the swaging structure as claimed in claim 1.

4. A swaging structure for metallic members, the swaging structure comprising:
    a flat plate-shaped first metallic member having a hole portion; and a disc-shaped second metallic member which is fitted in the hole portion and thereafter fixed to the first metallic member by swaging a circumference of the hole portion, wherein the first metallic member includes groove portions provided in both surface sides of the first metallic member about the hole portion of the first metallic member, and the second metallic member includes a vertical flange protruding from one surface side and a horizontal flange from another surface side of the second metallic member, on an outer circumference of the second metallic member, wherein the second metallic member is fitted in the hole portion of the first metallic member, and when the second metallic member is swaged onto the first metallic member, the horizontal flange of second metallic member is fitted in one of the groove portions and the vertical flange of the second metallic member is deformed, the deformed vertical flange being flush with one surface of the first metallic member, and the other groove portion of the first metallic member is filled with the deformed vertical flange.

5. The swaging structure according to claim 4, wherein the vertical flange is provided on the entire outer circumference of the one surface side of the second metallic member, the vertical flange having a substantially triangular shape in section, in which at least an inner circumferential surface is inclined, and wherein the vertical flange, when it is swaged, is deformed outward.

6. A bus bar comprising:

a metallic plate having at least one pair of hole portions; and a conductive member fitted in one of the pair of hole portions and swaged onto the metallic plate, wherein the metallic plate and the conductive member are fixed by the swaging structure as claimed in claim 4.

7. A swaging structure for metallic members, the swaging structure comprising:

a flat plate-shaped first metallic member having a hole portion; and a disc-shaped second metallic member which is fitted in the hole portion and thereafter fixed to the first metallic member by swaging a circumference of the hole portion, wherein the first metallic member includes groove portions provided in both surface sides of the first metallic member about the hole portion of the first metallic member, and the second metallic member includes a vertical flange protruding from one surface side and having a substantially triangular shape in section, in which at least an inner circumferential surface is inclined, and a horizontal flange from another surface side of the second metallic member, on an outer circumference of the second metallic member, wherein the second metallic member is fitted in the hole portion of the first metallic member, and when the second metallic member is swaged onto the first metallic member, the horizontal flange of the second metallic member is fitted in one of the groove portions and the vertical flange of the second metallic member is deformed outward, and the other groove portion of the first metallic member is filled with the deformed vertical flange.

8. The swaging structure according to claim 7, wherein when the second metallic member is swaged on the first metallic member, one surface of the first metallic member and the deformed vertical flange are flush to each other.

9. A bus bar comprising:

a metallic plate having at least one pair of hole portions; and a conductive member fitted in one of the pair of hole portions and swaged onto the metallic plate, wherein the metallic plate and the conductive member are fixed by the swaging structure as claimed in claim 7.

* * * * *